United States Patent Office 3,263,463
Patented August 2, 1966

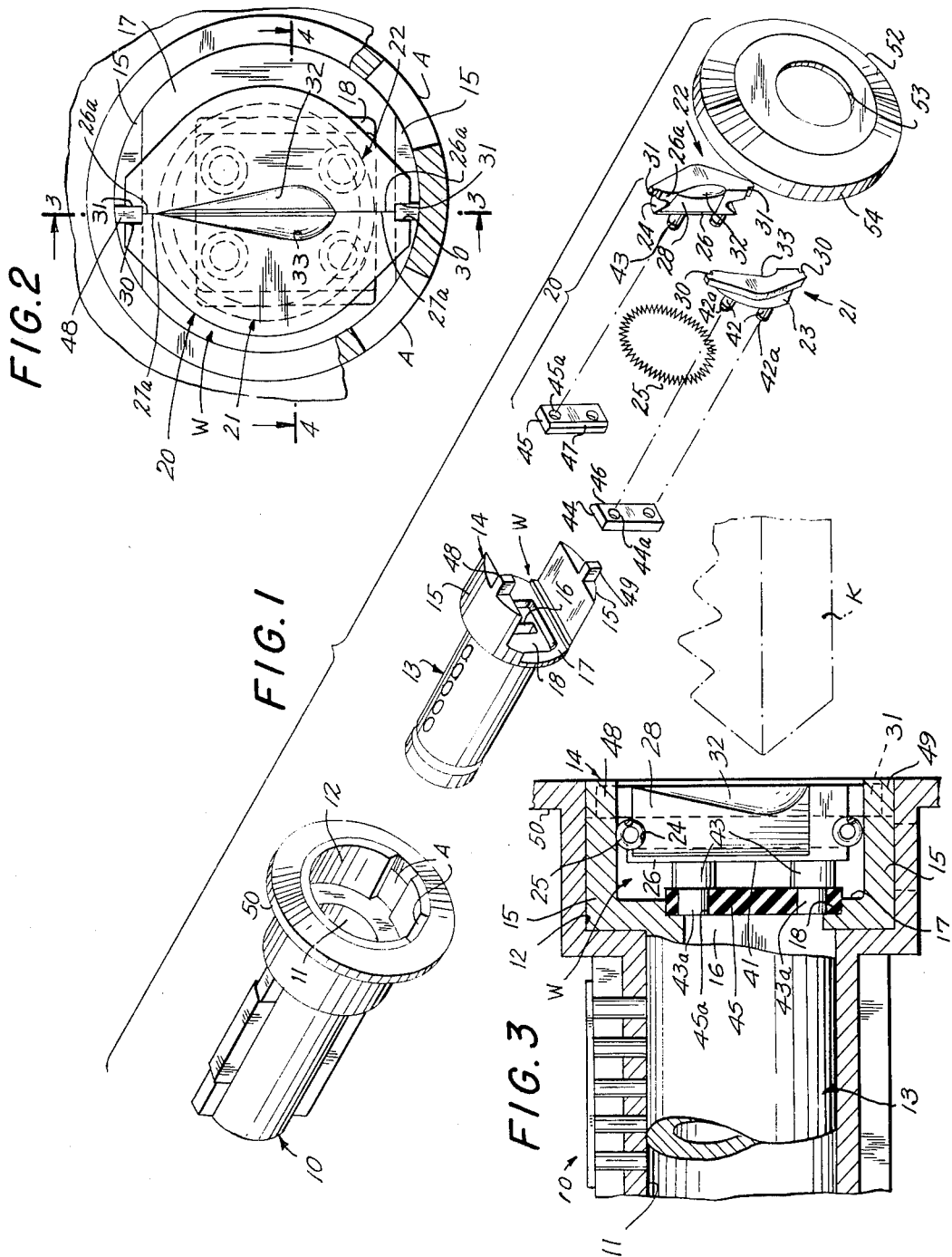

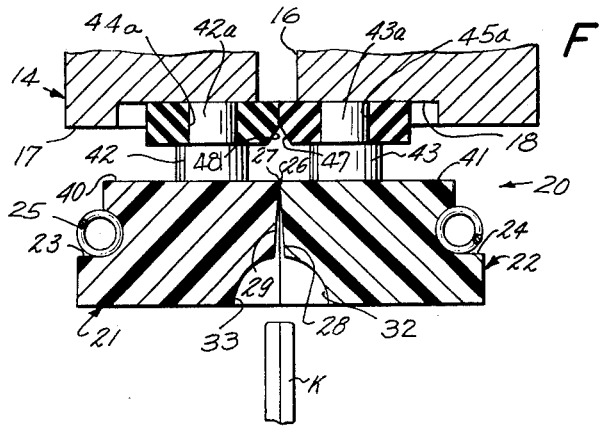
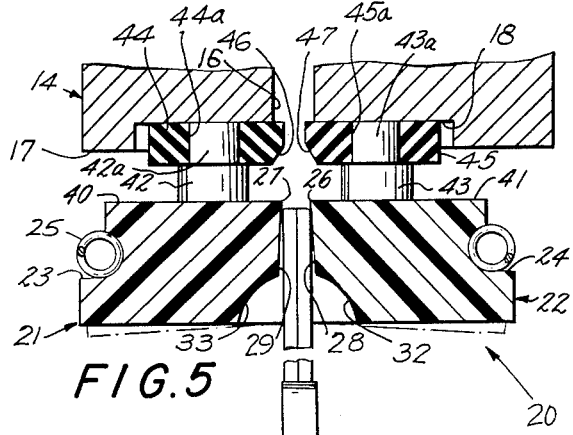
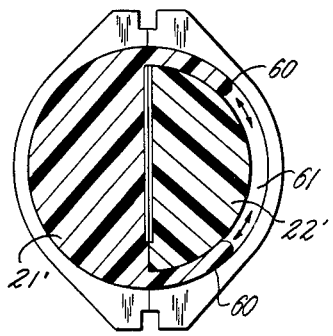
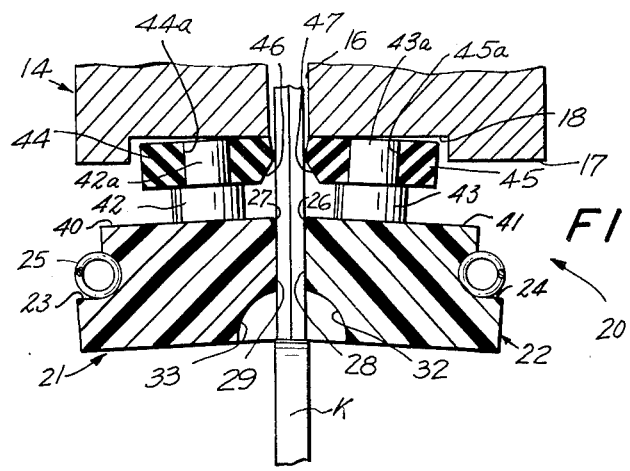

3,263,463
WEATHER SEAL
Robert Armand Duval and George P. Patriquin, Worcester, Mass., assignors to Independent Lock Company, Fitchburg, Mass., a corporation of Massachusetts
Filed Apr. 24, 1964, Ser. No. 362,430
10 Claims. (Cl. 70—455)

This invention relates to a weather seal for a cylinder lock and more particularly to a cylinder lock and weather seal of the type employed on lock units exposed to the elements, for the purpose of preventing the ingress of moisture, detritus and the like into the interior of the lock mechanism.

Still more particularly, this invention relates to an improved weather seal for a cylinder lock wherein the weather-tightness of the construction is not compromised notwithstanding repeated use.

This invention further relates to a compact weather seal construction requiring a minimum of elongation of the lock assembly for accommodation of the weather seal.

This invention further relates to a highly efficient weather seal employing plural sealing barriers, whereby passage of moisture, detritus or the like beyond the first said barrier will not compromise the seal.

The invention further relates to a weather seal device for sealing the keyway of a cylinder lock, which employs an elastomeric seal member for optimum weather-tight security, the seal device being so constructed as to minimize or eliminate wear on the elastomeric components of the seal.

This invention relates further to a weather seal for a lock having plural barriers which seal is so constructed as to minimize the wear effects of repeated useage on both barriers.

Accordingly, it is an object of the invention to provide an efficient, inexpensive, readily assembled weather seal.

A further object of the invention is the provision of a weather seal for a cylinder lock or the like which may be independently formed into a sub-assembly, which sub-assembly may be integrated and introduced as a single component into the lock assembly, thereby greatly to facilitate the manufacture of the unit.

A still further object of the invention is to provide a two barrier lock seal, with downwardly directed drain means disposed between the barriers, whereby any moisture which may penetrate the first barrier of the seal is prevented from entering the lock mechanism by the second barrier, and accumulation adjacent said second barrier is prevented by said drain means.

Still a further object of the invention is the provision of a cylindrical lock having a double barrier weather seal, including an outer barrier made of a wear resistant material against which the key may contact, and an inner seal of elastomeric and, hence, a less wear resistant material, the construction being such that in advance of the key passing from the wear resistant to the non-wear-resistant seal, the last named seal is caused to spread so that no substantial contact between the key and the non-wear-resistant seal is experienced.

To attain these objects and such further objects as may appear herein or be hereinafter pointed out, reference is made to the accompanying drawings, forming a part hereof, in which:

FIGURE 1 is an exploded pre-assembled perspective view of a weather seal cylinder lock assembly in accordance with the invention;

FIGURE 2 is a magnified vertical sectional view of the assembly, with parts being broken away to show details of construction;

FIGURE 3 is a fragmentary vertical section taken on the line 3—3 of FIGURE 2;

FIGURES 4, 5 and 6 are fragmentary horizontal sections taken on the line 4—4 of FIGURE 2 in various stages of insertion of a key into the weather seal mechanism;

FIGURES 7 and 8 are vertical sectional views of an additional embodiment of the invention.

In accordance with the invention, there is shown in FIGURE 1 a lock housing 10 having a longitudinally extending internal bore 11. The lock mechanism in the illustrated housing is of the conventional pin tumbler type, most details of the mechanism being eliminated for purposes of clarity. While the invention is illustrated in conjunction with a pin tumbler type lock, it will be readily appreciated that it is equally adaptable for incorporation with other types of locks, such as disk tumbler locks.

The housing 10, at its forward end adjoining the bore 11, is formed with a wider bore portion 12. A lock cylinder 13 is insertible endwise into the bore 11 and incorporates adjacent its outer end 14, opposed arcuate extensions 15, 15 which, in the inserted position of the cylinder 13 and the housing, ride in close adjacency to the wider bore portion 12.

The lock cylinder 13 incorporates the usual longitudinally extending keyway 16, of irregular cross section, for the reception of a key of corresponding cross section.

The outer end of the lock cylinder 13, between the arcuate portions 15, defines a well W open to the outer end of the lock cylinder. The weather seal assembly next to be described rides within this well.

The end face 17 of the well of the lock cylinder is recessed as at 18 for the reception of the innermost portions of the weather seal next to be described.

The weather seal sub-assembly, referred to collectively as 20, comprises two half sections, each of which has an outer seal portion and an inner seal portion spaced inwardly from the outer seal portion.

As best seen in FIGURE 1, the outer seal members or shutters 21, 22 are generally semi-cylindrical in configuration. Optionally but preferably, the outer seal members 21, 22 are formed of a wear resistant plastic material, such as nylon or a like long chain polyamide, although it will be readily understood that in the context of the present invention, any wear resistant material, such as a metallic material, may be employed.

The outer seals 21, 22 are provided with parti-annular grooves 23, 24 on their peripheries for the reception of a garter or toroidal spring 25. The spring 25 is of such size as to be placed under tension when seated within the grooves 23, 24, and thus tends to squeeze the two seal members 21, 22 against each other.

In the normal seated position of the seals against each other, a seal connection between the two halves is effected along a line adjacent the rearmost edge between the portions 26, 27, see FIGURES 1 and 4 through 6.

It will be observed that the portions 28, 29 directly forward of the engaging portions 26, 27, are angularly diverging with respect to the portions 26, 27, which last named portions are parallel with the plane of the keyway 16.

The outer seals 21, 22 additionally, at their upper and lower extremities, are notched, as at 30, 30, and 31, 31, respectively, for purposes which will appear hereafter.

The outer seals 21, 22 are provided further with cam surfaces 32, 33 tapering inwardly and rearwardly from the front face of the members 21, 22. The cam surfaces 32, 33 are of a height which corresponds substantially to the height of the keyway 16.

Extending rearwardly from the rear faces 40, 41 of the outer seals 21, 22, respectively, are stepped parallel spacer posts 42, 42, and 43, 43, respectively. A pair of inner seals 44, 45 are mounted on the reduced rearmost portions 42a, 42a, and 43a, 43a of the stepped posts 42, 42 and 43, 43, the seals 44, 45 being provided with spaced apertures 44a, 45a, which are snugly sleeved over the reduced portions 42a, 43a.

The weather seal assembly 20 which comprises the outer seals 21, 22, the inner seals 44, 45, and the spring 25, may be seated within the well W, in which position rearwardly extending lugs 48, 49 of lock cylinder 13 lie within the space defined between the notches 30, 31 at the upper and lower portions of the front seal members. It will be observed that the lugs and notches form a driving connection between the seal assembly 20 and the cylinder 13, whereby the junction between the front and rear seals is maintained in alignment with the place of the keyway 16. It will be observed from the foregoing that the outer members 21, 22 form in effect support means for the inner seals 44, 45 and as hereinafter pointed out many of the advantages of the present invention may be realized where the support means 21, 22 serve merely to carry and spread the rear seals and do not themselves form a weather proof barrier.

In the fully inserted position of the weather seal in the cylinder 13, the rear seal members 44, 45 ride within the generally square recess 18. Preferably, the outwardly directed faces of the inner seals 44, 45 are beveled as at 46, 47, respectively.

The lock cylinder 13, with the weather seal 20 seated therein in the manner aforesaid, rides in the bores 11 and 12 of the housing 10. As best seen in FIGURES 1 to 3, the housing is provided with downwardly opening apertures A which extend through a lower part of the housing, the apertures being longitudinally disposed so as to register with the space between the front and rear seals and arcuately arranged to be to either side of the lower arcuate extension 15 of the lock cylinder. It will thus be observed, particularly from FIGURE 2, that any moisture which may penetrate the front seal 21, 22 will be blocked from passage through to the interior of the lock cylinder by the inner seal 44, 45. No accumulation of moisture in the area between the seals will be permitted, by the downwardly directed drain apertures A.

It will be understood that in normal usage, the rear shoulder 50 of the housing will be pressed against the outer surface of a door panel, such as an automobile door panel, and hence the apertures A will drain into the space between the door panels, and there is therefore no likelihood of the moisture entering into the lock structure through the said apertures.

The weather seal assembly is maintained with the lock cylinder by an end cap 52 which is centrally apertured at 53 to permit the insertion of a key K. The cap 52 is secured to the housing 10 with the innermost portion of the rim 54 of the cap spun over behind the shoulder 50 of the housing. The connection of the housing and cap is such as to provide some clearance between the rear face of the cap and the outer face of the outer seal members 21, 22.

One of the primary advantages of the weather seal device is that it permits the use of elastomeric inner seal portions but is so constructed as to reduce to a minimum any wear on these readily deformable portions. Specifically, any attempt to provide a weather seal assembly formed between two abutting elastomeric surfaces wherein an opening or spreading of such surfaces is effected by direct contact between the elastomeric portions and the tip of the key, will result in an unsatisfactory structure. While a tight initial seal may be effected between the elastomeric parts, repeated insertion and removal of a key will compromise the sealing effect of the two surfaces so that after a relatively short usage, the surfaces will become distorted and irregular, and sealing contact between the surfaces will be lost.

In the weather seal of the present invention, the outer wear resistant surfaces 21, 22 serve to spread the inner seals 44, 45 so that a key may pass beyond such surfaces with no contact or with minimal contact with the said inner surfaces. This novel and highly desirable result is attained by the employment of the outer wear resistant seals, which serve several functions, including (1) an initial closure for diverting moisture, (2) a wear resistant carrier for the inner seals which spreads the inner seal in advance of an inward thrust of a key.

The angular portions 28, 29 also aid in assuring that the rear seals are spread a distance equal to or in excess of the thickness of the key. This function will be best understood by comparing FIGURES 4, 5 and 6 wherein the seal is shown, respectively, in the closed position in a condition of initial insertion of a key, and in a further partially inserted position of the key.

As seen in FIGURE 4, the initial engagement between the front seal members 21, 22 is along the flat back surface portions 26, 27 the portions 28, 29 being gapped or spread apart. The engagement of said portions 26, 27 is assured additionally by the fact that other portions of the front seals, such as the portion 26a, as seen in FIGURE 2, which lies forward of the annular receptable for the spring 25 and which is co-planar with the rear surface 26, lies in engagement with similarly located portions 27a of the other front seal 21.

In short, in the sealing position before insertion of a key, the front seals 21, 22 are maintained in co-planar orientation by the engagement of parts 26, 27, 26a and 27a. However, as a key K is inserted, the tip of the key will engage the cam surfaces 32, 33, causing an initial spreading of the front seals and, hence, of the rear seals. With continued insertion of the key K, contact between the portions 26 and 27 will be interrupted and the spring 25 will tend to draw the angled portions 28, 29 into engagement with the opposite side faces of the key. The net effect of the insertion of the key is thus to cause a slight tilting of the outer seal members 21, 22 with respect to each other as permitted by clearance with the end cap, which tilting is accompanied by a concomitant spreading of the inner seal members. It will thus be observed that by the use of the angled portions 28, 29, a spreading of the inner seal members of a distance in excess of the thickness of the key is obtained when a key is inserted between the front seal members.

The importance of this excess spreading is realized in particular where a relatively soft elastomeric material such as will form the most efficient seal is used in the formation of the rear seal members 44, 45 since employment of such material results in a compression of the inner seals at their engaging surfaces. As said inner seals are spread, the compressed material will tend to expand inwardly into the path of an inserted key, and, consequently, it will be appreciated that a spreading of the inner seals to an extent which merely equals the thickness of the inserted key will not be sufficient in all instances completely to clear the inner seal from the path of the key.

Still a further benefit achieved by the provision of the angular portions 28, 29 is the reduction of wear on the opposed contacting portions 26, 27 of the front seals. This reduction results from the fact that as the key slides inwardly through the front seal, the tilting of the front seal portions cause the key to wipe or slide against portions 28, 29 rather than the weather blocking edges 26, 27 of the front seal.

While it should be understood that many of the benefits of the invention may be secured without the provision of the angular portions 28, 29, it has been determined that the inclusion of such portions provides a superior wear resistant seal construction.

In FIGURES 7 and 8 there is shown an alternative embodiment of the invention wherein the use of the spring 25 is omitted. For this purpose, the front seal members 21', 22' are provided, respectively, with annular resilient extension members 60 and an annular extension receiving groove 61. With the parts assembled as shown in FIGURE 7, it will be recognized that the resilient force exerted by the extension members 60 in the groove 61 tends to urge the front seals into engagement. When a key is inserted between the seals, the latter are spread to the position shown in FIGURE 8, it being understood that the withdrawal of the key is accompanied by a return to the sealing position of FIGURE 7.

The extensions and grooves are so dimensioned to permit a pivoting of the front seals with respect to each other upon insertion of a key, and hence to provide the magnified spreading of the rear seals as described in connection with the prior embodiment.

From the foregoing it will be appreciated that the invention herein enables the production of a tight weather resistant seal device of simple design which is susceptible of economic manufacture and assembly. The seal may be assembled as a unit, with the unit as a whole being inserted into an appropriate lock structure.

By the use of longitudinally spaced separate sealing members, there is provided an improved water resistant assembly which overcomes the tendencies observed in weather seal structures heretofore known to lose their weather tightness after protracted use. Specifically, weather seals of the shutter type, wherein a plate is spring pressed against the inner surface of a cap member will ordinarily be compromised as to their weather resisting properties by the frequent insertion of a key against the shutter, and the resultant wear or formation of burrs on the shutter. In the present invention, and particularly the preferred embodiment thereof, the rear seal is preferably subjected to no appreciable wear, not withstanding repeated insertion and removal of a key. Moreover, the surfaces of the front seal, which provide the actual weather barrier are subjected to a minimum of wear.

While the invention has been illustrated in conjunction with a weather barrier having two distinct seals, it will be readily recognized that a highly satisfactory seal may be provided wherein the seal is formed entirely by the inner seals using the outer elements merely as a means for engaging and spreading the inner seals to preserve the inner seals against wear.

We claim:

1. A weather resistant cylinder lock assembly comprising a lock housing having a bore, a lock cylinder rotatably mounted in said bore and having a longitudinally extending keyway, a weather seal disposed at the front of said cylinder in a well including first and second transversely shiftable half sections, each said half section including longitudinally spaced front and rear shutter members, spring means engaging said sections and biasing front and rear shutter members of one said section transversely into mating engagement with the front and rear shutter members, respectively, of the other said section, the plane of engagement between said shutter members being substantially coincident with the plane of said keyway, means keying said half sections to said cylinder for rotation therewith, cam means formed on the outer face of said front shutter members adjoining the engaging portions of said front shutter members for separating said sections as a key is inserted into said keyway, and a downwardly directed aperture formed through a lower part of said housing in registry with a space between said front and rear shutter members.

2. A weather resistant cylinder lock assembly comprising a lock housing having a bore, a lock cylinder roatably mounted in said bore and having a longitudinally extending keyway, a weather seal adjacent the face of said cylinder including first and second transversely shiftable half sections, each said half section including longitudinally spaced front and rear shutter members, spring means biasing said front and rear shutter members of one said section into mating engagement with the front and rear shutters, respectively, of the other section, the engaging surfaces of said shutter being disposed substantially in a plane coincident with said keyway, and a downwardly directed aperture formed through a lower part of said housing in registry with a space between said front and rear shutter members.

3. A weather-resistant cylinder lock assembly comprising a lock housing having a bore, a lock cylinder rotatably mounted in said bore and having a longitudinally extending keyway, a weather seal disposed at the front end of said lock cylinder, means keying said seal to said cylinder for rotation therewith, said seal including first and second half sections mounted for sliding movement normal to the axis of said bore, each said half section including longitudinally spaced front and rear shutter members, said front shutter members being formed of a wear resistant material, said rear shutter members being formed of readily deformable, resilient material, spring means urging said sections toward each other to bias said front and rear shutter members of one section into mating engagement with the front and rear shutter members, respectively, of said other section with a force sufficient to slightly distort said rear shutter portions at the engaging surfaces thereof, the engaging surfaces of said front and rear shutter members being disposed within an area comprising a forward continuation of said keyway, cam means formed adjacent the engaging portions of said front shutter members for separating said sections transversely when a key is inserted against said cam means, said front shutter portions being so shaped as to spread said rear shutter portions a distance at least equal to the thickness of said key in advance of movement of said key into registry with said rear shutter portions, and cap means engaging said housing for maintaining said weather seal adjacent the front of said cylinder.

4. A weather resistant lock assembly in accordance with claim 3 wherein each of said front shutter members includes a circumferential groove, and said spring means comprises an annular spring member seated in the grooves of said sections.

5. A device in accordance with claim 4 wherein the opposed faces of said front shutters in an area coincident with the forward continuation of said keyway and with a plane transversely intersecting said annular spring are formed with forwardly diverging recessed portions whereby, when a key is passed between said front shutters, said spring will press said divergent recessed portions against the said faces of said key, thereby to dispose the front faces of said front shutters at an angular orientation one to the other and to spread apart said rear shutters a distance in excess of the distance between said front shutters.

6. In a cylindrical lock assembly including a lock housing having a bore and a lock cylinder rotatably mounted in said bore having a longitudinally extending keyway, a weather seal for mounting at the outer end of said cylinder to rotate with said cylinder comprising first and second, relatively movable half sections, each said section including a front shutter, an elastomeric rear shutter and means supporting said rear shutter in spaced coplanar alignment with said front shutter, spring means biasing said sections together to urge the surfaces of the front shutters and rear shutters, respectively, into sealing engagement, and cam means on the front shutters adjacent the engaging surfaces, movement of a key through said front shutters being effective to urge said engaging surfaces of said front shutters against side portions of said key and thereby spread apart said rear shutters.

7. A weather seal in accordance with claim 6 wherein central portions of said front shutter adjoining said cam means and engaging surfaces are formed to define forwardly diverging recess portions and said spring means is located on said front shutters in position to urge said diverging recess portions against sides of said key as the latter passes through said front shutter.

8. A weather resistant cylinder lock assembly comprising a lock housing having a bore, a lock cylinder having a longitudinally extending keyway mounted in said bore, said cylinder having a well formed in the outer end surrounding said keyway, inwardly directed lugs formed on said cylinder and extending into said well, a weather seal mounted in said well comprising transversely shiftable half sections, each said half section including longitudinal front and rear shutter portions, spring means biasing opposed surfaces of the front and rear shutter portions, respectively, of said sections into sealing engagement, recess portions formed on said front shutter portions, said lugs of said cylinder being disposed in said recess portions, thereby to drivingly connect said weather seal to said cylinder with said opposed surfaces in alignment with said keyway, cam means having transverse slope components formed on the front face of said front shutter adjoining said opposed surfaces, an aperture formed through a lower part of said housing in registry with a space between said shutters, and retainer cap means engaging said housing for securing said weather seal against displacement from said well, said cap means including a central aperture for insertion of a key.

9. A weather resistant lock assembly comprising a housing, a lock cylinder having a keyway, said lock cylinder being rotatably mounted in said housing, a pair of front shutter members keyed to rotate with said cylinder, rear seal members carried by and spaced rearwardly from each of said shutter members, spring means operatively associated with said shutters for biasing opposed portions of said rear seal members into sealing engagement in alignment with said keyway, said spring means normally holding said shutters in a predetermined angular oriented position with respect to each other, opposed, forwardly diverging fulcrum portions on said shutters disposed angularly with respect to the plane of said keyway, and key means insertible through said shutters, said spring means biasing the fulcrum portions of said shutters into engagement with the sides of said key means as the latter passes through said shutters, thereby to shift said shutters to a different angular orientation with respect to each other, said rear seals, in said different angular orientation, being spread a distance greater than the thickness of said key means.

10. A weather resistant lock including a housing, a lock cylinder rotatably mounted in said housing and having a keyway, a weather seal member mounted for rotation with said cylinder having outer seal support means mounted for pivotal movement about an axis parallel with the plane of said keyway, seal means carried by said seal support means in rearwardly spaced relation thereto, spring means engaging said seal support means and biasing said seal support means to a first angular orientation whereat said seal means is shifted to blocking position of said keyway, a fulcrum portion on said seal support means located forwardly of said seal means and disposed in a path defining a forward extension of said keyway, movement of a key into said keyway being effective to engage said fulcrum against a side of said key, to thereby pivot said seal support means to a second angularly oriented position whereat said seal means is cleared from blocking position of said keyway.

References Cited by the Examiner
UNITED STATES PATENTS

| | | | |
|---|---|---|---|
| 2,874,563 | 2/1959 | Schlage | 70—455 |
| 2,956,430 | 10/1960 | Simmons | 70—455 |
| 3,077,101 | 2/1963 | Jacobi | 70—455 |

PATRICK A. CLIFFORD, *Primary Examiner.*

P. TEITELBAUM, *Assistant Examiner.*